United States Patent
Takemoto

(10) Patent No.: US 6,744,716 B1
(45) Date of Patent: Jun. 1, 2004

(54) PICKUP MOVING MECHANISM FOR OPTICAL DISK APPARATUS AND PICKUP MOVING METHOD THEREFOR

(75) Inventor: Isao Takemoto, Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 448 days.

(21) Appl. No.: 09/889,964

(22) PCT Filed: Nov. 24, 2000

(86) PCT No.: PCT/JP00/08318

§ 371 (c)(1),
(2), (4) Date: Jul. 24, 2001

(87) PCT Pub. No.: WO01/39185

PCT Pub. Date: May 31, 2001

(30) Foreign Application Priority Data

Nov. 25, 1999 (JP) .............................................. 11-333537

(51) Int. Cl.⁷ ................................................ G11B 3/90
(52) U.S. Cl. .................................. 369/53.19; 369/44.32
(58) Field of Search ........................... 369/44.32, 47.36, 369/53.19, 53.42, 44.14, 44.21, 53.14, 119

(56) References Cited

U.S. PATENT DOCUMENTS 6,418,104 B1 * 7/2002 Sato et al. ................ 369/53.19

FOREIGN PATENT DOCUMENTS

| JP | 59-223942 A | 12/1984 |
| JP | 2-123529 A | 5/1990 |
| JP | 10-64096 A | 3/1998 |
| JP | 10-162395 A | 6/1998 |
| JP | 10-312564 | 11/1998 |
| JP | 11-25466 A | 1/1999 |
| JP | 11-213415 A | 8/1999 |
| WO | WO 01/39185 A1 | 5/2001 |

* cited by examiner

Primary Examiner—Paul W. Huber
(74) Attorney, Agent, or Firm—Parkhurst & Wendel, L.L.P.

(57) ABSTRACT

A pickup moving mechanism for making it difficult to generate a deviation between an optical axis of an optical pickup and a target position on a disk. This mechanism is constituted to comprise: an elevation member tilting a guide member based on an angle deviation of the optical axis of the optical pickup in a disk diameter direction, and inclining the optical pickup supported by the guide member in a direction in which the angle deviation of the optical axis decreases; a cam follower; a tilt motor; an eccentric cam; an urging means; and a controller for controlling a pickup motor operating a screw member and an engagement member so as to move the optical pickup in a direction in which the deviation of the optical axis in the disk diameter direction generated by inclination of the optical pickup decreases.

6 Claims, 7 Drawing Sheets

(a)

(b)

(a)

(b)

(a)

(b)

(a)

(b)

(c)

(d)

PICKUP MOVING MECHANISM FOR OPTICAL DISK APPARATUS AND PICKUP MOVING METHOD THEREFOR

This application is a 371 of PCT/JP00/08318, filed Nov. 24, 2000.

TECHNICAL FIELD

The present invention relates to a pickup moving mechanism and a pickup moving method for an optical disk apparatus for introducing a laser beam into an optical disk to record or reproduce information. More particularly, the present invention relates to a pickup moving mechanism and a pickup moving method for an optical disk apparatus having a control function, or a so-called tilt servo mechanism, for maintaining perpendicularity between the optical disk and an optical axis of an optical pickup.

BACKGROUND ART

In an optical disk apparatus, it is essential that the angle between an optical disk (hereinafter, referred to as disk) and the optical axis of an optical pickup for introducing a laser beam to the disk and recording or reproducing information is an angle at which the optical disk is perpendicular to the optical axis. In an actual apparatus, however, the above-stated angle is deviated from the latter angle at which the optical disk is perpendicular to the optical axis because of warpage of the disk, tolerance accumulation of a mechanism section or the like, a mechanism for adjusting or controlling this angle is devised.

As an apparatus for adjusting the angle formed between the disk and the optical axis of the optical pickup, there is known an apparatus shown in Japanese Unexamined Patent Publication No. 10-116479. The constitution of the apparatus will be described based on FIG. 5.

A disk motor 2 rotating and supporting a disk (not shown) is fixed onto a base 1, and an optical pickup 3 introducing a laser beam to the disk and recording or reproducing information is supported by a pair of guide members 4 and 5 so that the optical pickup 3 is movable in the diameter direction of the disk. A pickup driving motor 6 for driving the optical pickup 3 is fixed to the base 1 and the motor 6 transmits a driving force to a screw member 7 supported by bearings 1a and 1b provided on the base 1 to be rotatable about a axial core through gears 8 and 9. An engagement member 10 having an inclined portion 10a engaged with the screw member 7 and converting the rotation of the screw member 7 into the movement of the optical pickup 3 is fixed to the optical pickup 3. One ends of the guide members 4 and 5 are supported by support portions 11 and 12 and tiltable about the support portions 11 and 12, respectively. The other ends of the guide members 4 and 5 are in contact with the tip ends of adjustment screws 14 and 15 which are engaged with the female threaded portions of a beam member 13 fixed to the base 1 and which move in the direction of the optical axis 3a of the optical pickup 3 by their own rotation while being pressed by urging means, respectively.

With the above-stated constitution, if the angle of the optical axis 3a of the optical pickup 3 with respect to the disk is deviated from the angle at which the optical axis 3a is perpendicular to the disk due to tolerance accumulation of the mechanism portion or the like, the deviation is detected by a signal from the optical pickup 3 or a tilt detection element, not shown. Due to this, by rotating the adjustment screws 14 and 15, the guide members 4 and 5 are tilted about the support portions 11 and 12, respectively, in the direction of the optical axis 3a, the optical pickup 3 supported by the guide members 4 and 5 is inclined with respect to the base 1 and the deviation of the optical axis 3a is adjusted. This angle adjusting device can be developed to an angle control device by driving the adjustment screws 14 and 15 using a motor.

As an optical disk apparatus utilizing angle control, there is known an apparatus shown in Japanese Unexamined Patent Publication No. 9-198687. The constitution of the apparatus will be described based on FIG. 6.

This optical disk apparatus is almost the same in constitution as that shown in FIG. 5. Namely, a disk motor 2 rotating and supporting a disk 16 is fixed on a base 1 and an optical pickup 3 introducing a laser beam to a disk 16 and recording or reproducing information is supported by a pair of guide members 4 and 5 so that the optical pickup 3 is movable in the diameter direction of the disk 16.

It is noted, however, a tilt detection element 17 for detecting the angle between the disk 16 and the optical axis 3a of the optical pickup 3 is provided on the optical pickup 3. Also, a pickup driving motor 6 for driving the optical pickup 3 is fixed to the base 1, and driving gears 18 and 19 engaged with the driving shaft of this pickup driving motor 6 are rotatably supported. An engagement member 10 which is engaged with this driving gear 19 and to which the driving force of the pickup driving motor 6 is transmitted through the driving gears 18 and 19 is provided to be fixed to the optical disk 3.

One ends of the guide members 4 and 5 are supported by support portions 11 and 12, respectively, while the other ends of the guide members 4 and 5 are supported by an elevation member 20 provided to be movable in a direction perpendicular to the base 1. The guide members 4 and 5 are tiltable about the support portions 11 and 12, respectively by the elevation member 20. The perpendicular movement of the elevation member 20 is based on the engagement of cam followers 20a formed on the both sides of the elevation member 20 with eccentric cams 22 fixed to the output shaft of tilt motors 21 fixed to the base 1, respectively.

With the above-stated constitution, if the angle of the optical axis 3a of the optical pickup 3 with respect to the disk 16 is deviated from an angle at which the optical axis 3a is perpendicular to the disk 16, the deviation is detected by a tilt detection element 17. Based on the detected deviation, the tilt motors 21 rotate, the elevation member 20 engaged with these tilt motors 21 through the eccentric cams 22 and the cam followers 20a move in the perpendicular direction, respectively, whereby the guide members 4 and 5 tilt about the support portions 11 and 12 in the direction of the axis 3a, respectively. As a result, the optical pickup 3 supported by the guide members 4 and 5 are inclined with respect to the base 1 and the deviation of the optical axis 3a is adjusted.

However, if the angle adjusting device shown in Japanese Unexamined Patent Publication No. 10-116479 is developed to an angle control device for driving adjustment screws by a motor, the following problems occur. If the optical pickup 3 is moved in the disk diameter direction, it is necessary to exercise movement control while detecting the position of the optical pickup 3. To do so, detection means such as a photo-interrupter is normally attached to either the pickup driving motor 6 or the screw member 7, or the pickup driving motor 6 is used as a stepper motor and the position of the optical pickup 3 is detected using the driving pulse of the motor 6, and the optical pickup 3 is moved to a predetermined position based on a detection result. In that case, the optical axis 3a of the optical pickup 3 thus moved does not sometimes agree with a target position on the disk to and from which information is to be recorded or reproduced. If the axis 3a does not agree with the target position, the optical characteristics of the optical pickup 3 may possibly deteriorate or the optical pickup 3 may be possibly required to be moved again, thereby disadvantageously increasing access time. The problems stated above will be described with reference to FIG. 7.

FIG. 7 is a view showing the essential parts of the device described with reference to FIG. 5 seen from a different observation point. FIG. 7(a) is a top view seen from the direction of the optical axis 3a of the optical pickup 3 and FIG. 7(b) is a side view of FIG. 7(a) except for the screw member 7. In FIG. 7(b), reference symbol 10a denotes an inclined portion formed on the engagement member 10 and the engagement member 10 is engaged with the screw member 7 on this inclined portion 10a. Since the screw member 7 is a right-hand screw, the inclined portion 10a is inclined by predetermined angle in a clockwise direction with reference to the optical axis 3a.

The engagement portion between the screw member 7 and the engagement member. 10 is typically shown in FIG. 7(c). In FIG. 7(c), the disk 16 is arranged in parallel to the base 1. The axial core 4a of the guide member 4 is, therefore, arranged in a direction along the base 1 and the optical pickup 3 moves to a position away from the support portion 11 by a distance r1. Namely, in response to an instruction to move the optical pickup 3 to the position away from the support portion 11 by the distance r1, the screw member 7 moves the inclined portion 10a engaged with the inclined surface 7a of the screw member 7 to the position shown in FIG. 7(c) in the direction along the base 1. The optical axis 3a of the optical pickup 3 to which the inclined portion 10a is fixed, extends perpendicularly to the base 1 and a position on the disk indicated by the intersection between the optical axis 3a and the disk 16 (hereinafter, referred to as disk diameter position) is located at a position away from the support portion 11 by a distance r2 (=r1).

FIG. 7(d) shows a case where the disk 16 is inclined. In FIG. 7(d), the disk 16 is inclined in a counterclockwise direction and the axial core 4a of the guide member 4 tilts downward toward the position shown in FIG. 7(d) around the support portion 11 according to the inclination of the disk 16. At this moment, a position detection signal obtained from the screw member 7 or the pickup driving motor is the same as that in the case of FIG. 7(c) described above. The inclined surface 7a of the screw member 7, therefore, moves to a position away from the support portion 11 by the distance r1 as in the case of FIG. 7(c). On the other hand, the inclined portion 10a engaged with the inclined surface 7a of the screw member 7 is slid downward and arranged at a position away from the support portion 11 by a distance r3 since the axial core 4a of the guide member 4 is shifted downward by tilting. As a result, a difference is generated between the position away from the support portion 11 by the distance r3 and the position away from the support portion 11 by the distance r1 on which the inclined portion 10a and the optical axis 3a are to be arranged. In addition, since the optical axis 3a of the optical pickup 3 to which the inclined portion 10a is fixed is in the direction perpendicular to the axial core 4a of the guide member 4, an actual disk diameter position indicated by the intersection between the optical axis 3a and the disk 16 is located at a position away from the support portion 11 by a distance r4. As a result, the distance between the position away from the support portion 11 by the distance r4 and the distance away from the support portion 11 by the distance r1 further increases.

As measures taken against the disagreement between the disk diameter position on which the optical axis 3a is to be arranged and the actual disk diameter position as stated above, it is contrived to drive the optical pickup 3 not by the screw member but by gears as in the case of the apparatus shown in Japanese Unexamined Patent Publication No. 9-198687 stated above. This driving method can be assumed as a case where a surface denoted as the inclined surface 7a in FIGS. 7(c) and 7(d) is parallel to the optical axis 3a. According to this driving method, however, while the diameter position r3 shown in FIG. 7(d) agrees with the diameter position r1, the diameter position r4 still differs from the diameter position r3. Furthermore, compared with the driving method using the screw member, this driving method has disadvantages of an increase in the number of parts, the deterioration of the positional accuracy of the optical pickup 3 due to backlash which occurs between the driving gears 18 and 19 shown in FIG. 6, the occurrence of hysteresis and the like. Besides, since inertia is normally high, this driving method has a disadvantage in that response frequency is low.

DISCLOSURE OF THE INVENTION

The present invention has been made to solve the above-stated problems and an object of the present invention is to provide a pickup moving mechanism for an optical disk apparatus using screw members as pickup driving means, capable of making it difficult to generate a positional deviation between the optical axis of an optical pickup and a target position on a disk even if the optical pickup is inclined so as to maintain perpendicularity between the disk and the optical pickup.

To obtain the above-stated object, the invention recited in claim 1 is an optical disk apparatus pickup moving mechanism comprising: a guide member supporting an optical pickup introducing a laser beam to an optical disk and recording or reproducing information, and guiding the optical pickup to move in a disk diameter direction; pickup driving means for driving the movement of the optical pickup; position detection means for detecting a position of the optical pickup in the disk diameter direction; tilt detection means for detecting an angle deviation of an optical axis of the optical pickup moved by a preset distance with respect to a recording or reproducing target position on the optical disk in the disk diameter direction; and tilt driving means for tilting the guide member in accordance with an output of the tilt detection means, and for inclining the optical pickup supported by the guide member in a direction in which the angle deviation of the optical axis decreases, characterized by providing control means for controlling the pickup driving means so as to move the optical pickup in a direction in which the deviation of the optical axis in the disk diameter direction generated by inclination of the optical pickup decreases.

According to the above-stated constitution, while inclining the optical pickup by the tilt driving means so as to control the angle between the optical disk and the optical axis of the optical pickup, the deviation of the optical axis of the optical pickup in the disk diameter direction generated by the inclination can be decreased by moving the optical pickup by the pickup driving means. It is, therefore, possible to introduce a laser beam to a target position on the optical disk to or from which position information is recorded or reproduced.

The invention recited in claim 2 based on the constitution of claim 2 is characterized by constituting the pickup driving means to comprise: a screw member provided along the guide member and rotating about an axial core; an engagement member provided at the optical pickup, engaged with the screw member, and converting rotation of the screw member into movement of the optical pickup in the disk diameter direction; and a rotation driving portion driving the rotation of the screw member.

The invention recited in claim 3 based on the constitution of claim 1 is characterized by constituting the tilt driving means to comprise: a support portion tiltably supporting the guide member in a direction in which the guide member approaches and separates from a base; urging means, provided between one end portion of the tiltable guide member and the base, for urging the one end portion of the guide member in a direction in which the one end portion separates from the base; pressing means provided to face the one end portion of the guide member to be able to be freely elevated, and capable of pressing the one end portion of the guide member against an urging force of the urging means; and elevation driving means for driving elevation of the pressing means in accordance with an output of the tilt detection means.

The invention recited in claim 4 based on the constitution of claim 2 is characterized by providing an inclined portion of the engagement member engaged with a threaded groove of the screw member is provided so that an angle of the inclined portion with the optical axis of the optical pickup is greater than 0 and a tangent thereof is smaller than 2L/R while information is recordable or reproducible up to a position of a diameter R on the optical disk and a distance between a support portion supporting the other end portion of the guide member and the optical disk is L.

By setting the angle of the inclined portion to fall within the above-stated range, it is possible to make the deviation of the optical axis of the optical pickup in the disk diameter direction derived from the inclination of the optical pickup smaller. The threaded groove of the screw member with which the inclined portion can be engaged is provided.

The invention recited in claim 5 is characterized in that: when an optical pickup introducing a laser beam to an optical disk and recording or reproducing information is supported by a guide member and moved in an optical disk diameter direction, the optical pickup is moved along the guide member by a preset distance with respect to a recording or reproducing target position on the optical disk while detecting a position of the optical pickup in the disk diameter direction; an angle deviation of the moved optical pickup from an optical axis in the disk diameter direction is detected; the guide member is tilted based on a detection result, and the optical pickup supported by the guide member is inclined in a direction in which the angle deviation of the optical axis decreases; and the optical pickup is moved in a direction in which the deviation of the optical axis in the disk diameter direction decreases by inclination of the optical pickup.

According to the above-stated constitution, while inclining the optical pickup so as to control the angle between the optical disk and the optical axis of the optical pickup, the deviation of the optical axis of the optical pickup in the disk diameter direction generated by the inclination is decreased by moving the optical pickup. It is, therefore, possible to introduce a laser beam to a target position on the optical disk to and from which position information is recorded or reproduced.

The invention recited in claim 6 based on the constitution recited in claim 5, is characterized in that when the optical pickup is inclined in a direction in which the optical pickup approaches the optical disk, the optical pickup is moved toward an outer peripheral side of the optical disk in the disk diameter direction.

According to the optical disk apparatus pickup moving mechanism of the present invention, the tilt driving means for inclining the optical pickup so that the optical disk is perpendicular to the optical axis of the optical pickup, and control means for controlling the pickup driving means so as to move the optical pickup in the direction in which the deviation of the optical axis generated by the inclination of the optical pickup decreases are provided, whereby a laser beam can be introduced to the target position of the optical disk to or from which information is recorded or reproduced by decreasing the deviation.

As the pickup driving means, a screw member is provided along the guide member, an engagement member engaged with the screw member is provided at the optical pickup and a rotation driving portion driving the rotation of the screw member is provided, for example, whereby the rotation of the screw member can be converted into the movement of the optical pickup in the disk diameter direction. At this time, when information up to a diameter R position on the optical disk can be recorded or reproduced and the distance between the support portion supporting the other end of the guide member and the optical disk is L, the deviation of the optical axis of the optical pickup in the diameter direction can be made smaller by providing the inclined portion of the engagement member engaged with the threaded groove of the screw member so that the angle between the optical disk and the optical axis of the optical pickup is greater than 0 and that a tangent thereof is smaller than 2L/R.

Furthermore, according to the pickup moving method for an optical disk apparatus of the present invention, the optical pickup supported by the guide member is moved in the disk diameter direction, the angle deviation of the optical axis in the disk diameter direction is detected, the guide member is tilted based on the detection result and the optical pickup is inclined in the direction in which the angle deviation of the optical axis decreases, and the optical pickup is moved in the direction in which the deviation of the optical axis in the disk diameter direction generated by the inclination decreases, whereby a laser beam can be introduced to the target position on the optical disk to and from which information is recorded or reproduced while decreasing the deviation.

MODES FOR CARRYING OUT THE INVENTION

A mode for carrying out the present invention will be described below concretely with reference to FIGS. 1 to 4.

Figure 5:
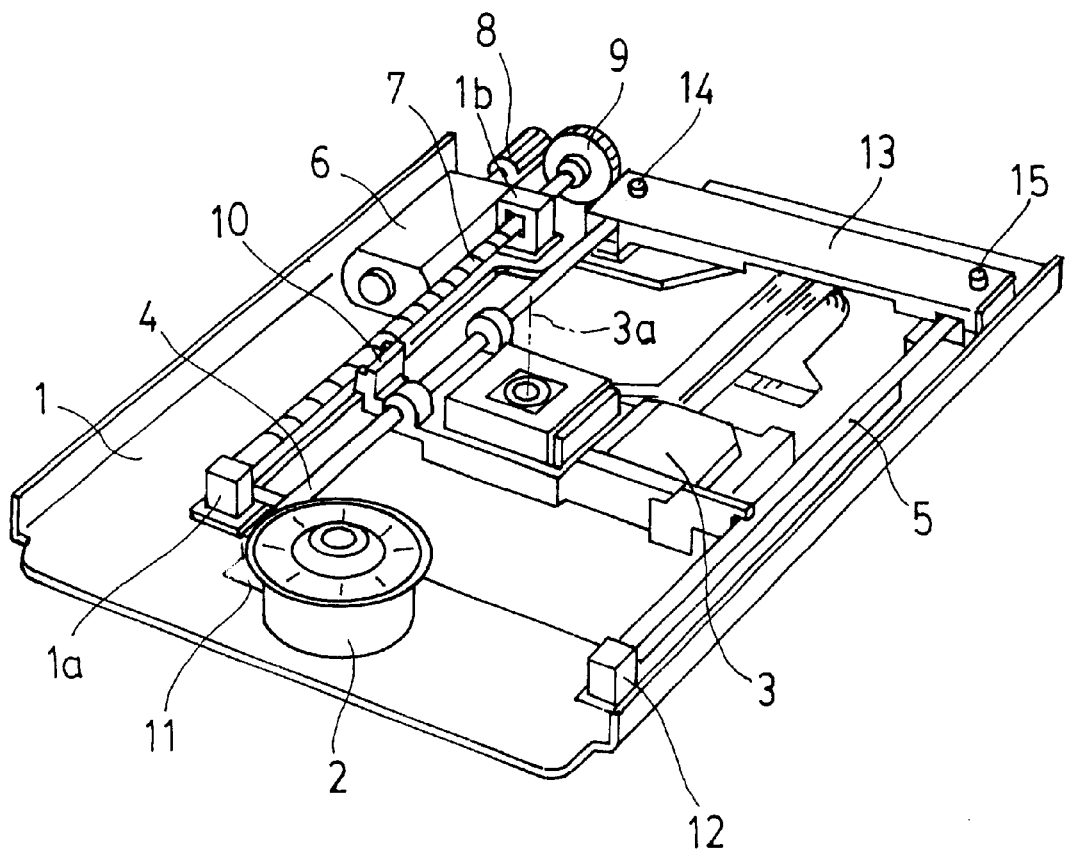
FIG. 5 is a perspective view showing a configuration of essential parts of a conventional optical disk apparatus.
Figure 6:
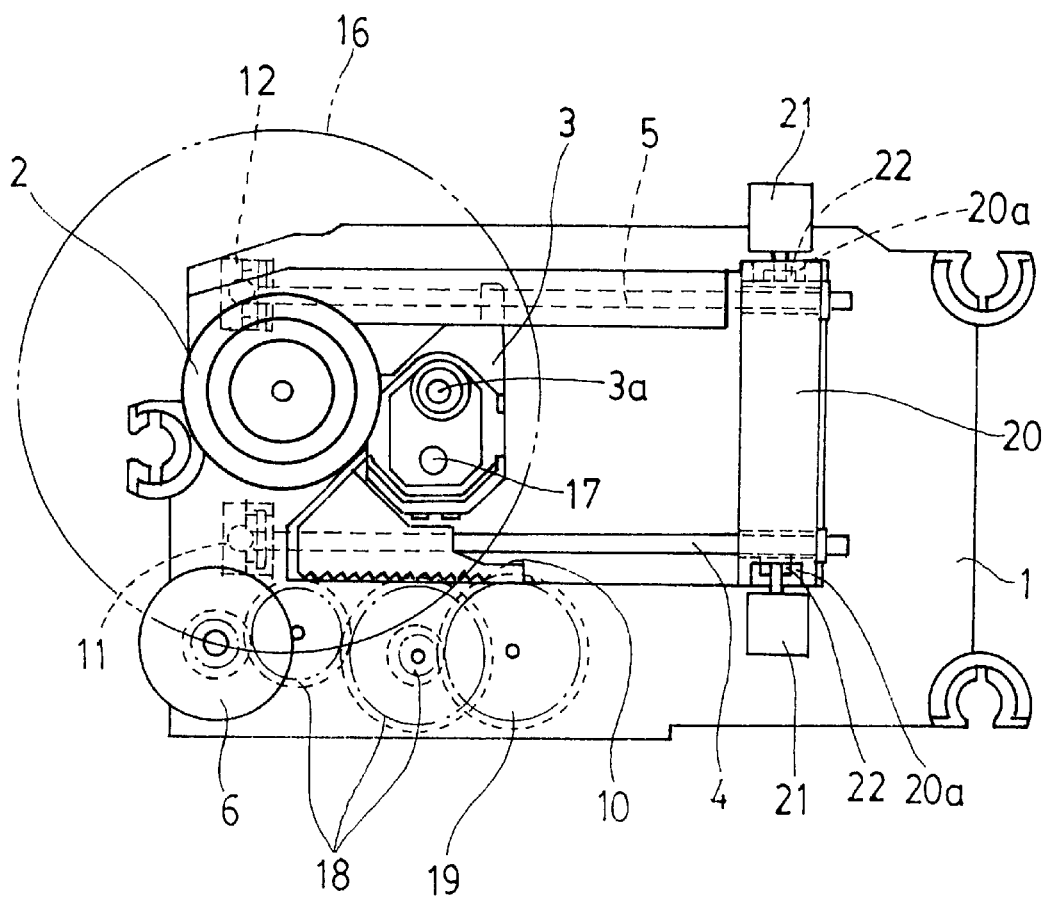
FIG. 6 is a top view showing essential parts of another conventional optical disk apparatus.
Figure 7:
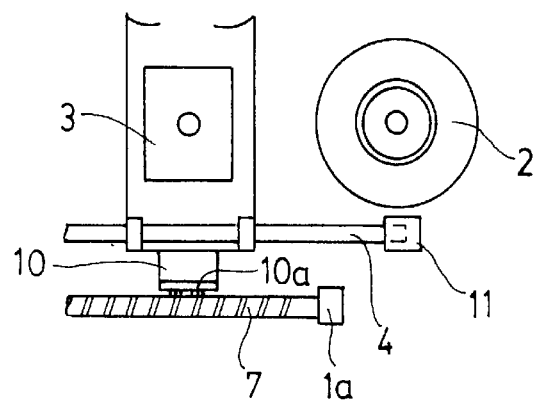
FIG. 7 is a schematic view showing positional errors of an optical disk in the optical disk apparatus shown in FIG. 5.
Figure 7:
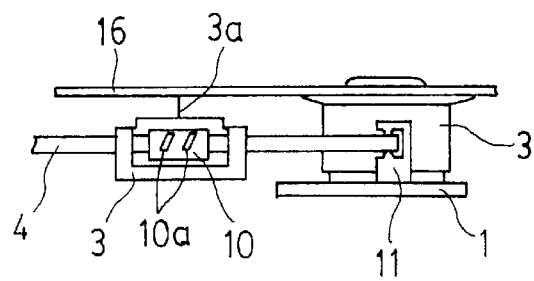
Figure 7:
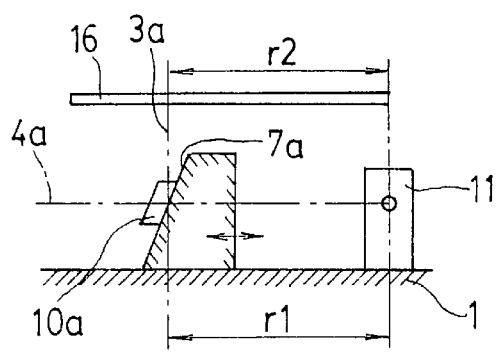
Figure 7:
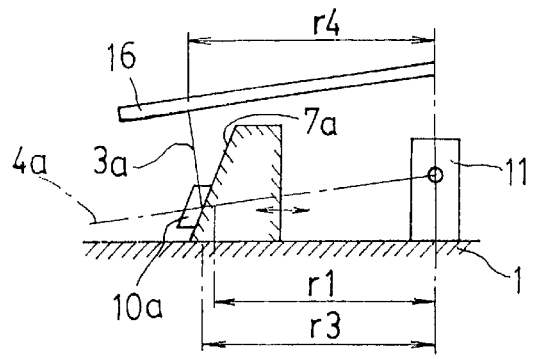

FIG. 1(a) is a top view of essential parts of an optical disk apparatus, and FIG. 1(b) is a side view thereof. This optical disk apparatus is almost the same in constitution as the conventional optical disk apparatus described above with reference to FIG. 5. The optical disk apparatus is constituted so that a disk motor 2 supporting and rotating a disk 16 is fixed onto a generally rectangular base 1 and an optical pickup 3 introducing a laser beam to the disk 16 and recording or reproducing information are provided. For description's sake, it is defined that a coordinate system x is a direction along the surface of the base 1 and the width direction of the base 1, y is a longitudinal direction, and z is a direction orthogonal to x and y. Symbol $\theta$ indicates an angle in a y-z plane and a counterclockwise direction is defined as +.

On the disk 16, information is recorded (or recordable) up to a maximum diameter indicated by "R" and information is reproduced (or recorded) by a laser beam in a direction along the optical axis 3a of the optical pickup 3.

Guide holes 3b and 3c are formed on one side of the optical pickup 3, a guide hole 3d is formed on the other side opposite to the one side, and the optical pickup 3 is supported by a guide member 4 provided to penetrate the guide holes 3b and 3c and by a guide member 5 provided to penetrate the guide hole 3d to be movable in a y direction.

A tilt detection element 17 for detecting the angle between the disk 16 and the optical axis 3a of the optical pickup 3 in the $\theta$ direction is formed on the upper surface of the pickup 3 facing the disk 16. Used as the tilt detection element 17 is an element comprising, for example, one light emission element emitting an infrared ray toward the disk 16 and two light receiving elements receiving a reflected light of the infrared ray from the disk 16 so that an angle difference between the disk 16 and the optical axis 3a is detected based on a difference in light quantity between the reflected lights entering the two light receiving elements.

A pickup driving motor 6 for driving the optical pickup 3 in the y direction is fixed onto the base 1 and connected to a screw member 7 supported by bearings 1a and 1b provided on the base 1 to be rotatable about an axial core so that the motor 6 can transmit power to the screw member 7. Also, an engagement member 10 having an inclined portion 10a, which has a predetermined angle $\beta$ and which is engaged with the threaded groove of the screw member 7, is fixed to the optical pickup 3, and the rotation of the screw member 7 is converted into a movement of the optical pickup 3 through the inclined portion 10a. The pickup driving motor 6 is provided with position detection means 23 for detecting the position of the optical pickup 3. Used as the position detection means 23 is an element comprising, for example, an optical slit fixed to the rotary shaft of the pickup driving motor 6 and a photo-interrupter fixed to a non-rotation portion so that a rotation quantity of the screw member 7 is calculated based on the output therefrom to detect the position of the optical pickup 3.

One end portions of the guide members 4 and 5 are held between support portions 11 and 12 provided on the base 1 to restrict the movements of the guide members 4 and 5 in the x and z directions. The movement thereof in the x direction is restricted by guide restricting portions 1c and 1d, and only the tilting thereof about the support portions 11 and 12 in the $\theta$ direction can be made. At the positions of the support portions 11 and 12, the guide members 4 and 5 are away from the disk 16 by a distance "L" in the z direction. The other end portions of the guide members 4 and 5 are located below a flat elevation member 20 supported by bearings 1e and 1f provided on the base 1 and movable only in the z direction. The other end portions of the guide members 4 and 5 are pressed in a +z direction by urging means 24 provided on the side of the base 1 in such a manner that they are always in contact with contact convex portions 20a and 20b on the lower surface of the elevation member 20.

A tilt motor 21 for driving the elevation member 20 is fixed to the base 1. An eccentric cam 22 is fixed to the rotary shaft of the tilt motor 21. A cam follower 20c is formed on the elevation member 20. The eccentric cam 22 and the cam follower 20c are kept in a state in which they contact with each other by pressing the elevation member 20 in the +z direction.

The function of the foregoing constitution will be described.

First, the movement of the optical pickup 3 will be described. In moving the optical pickup 3 on the disk 16 to a predetermined radial position corresponding to a target position to or from which information is recorded or reproduced, that is to say a position away from the center of the disk by a predetermined distance, a driving signal is inputted into control means by input means, which is not shown, thereby driving the pickup driving motor 6 and rotating the screw member 7 connected to this pickup driving motor 6. Whereby, the rotational force of the screw member 7 is converted into a movement force in the y direction by the inclined portion 10a engaged with the screw member 7, and the optical pickup 3 to which the engagement member 10 having the inclined portion 10a is fixed is moved in the y direction. At this moment, the rotational quantity of the screw member 7 is monitored by means of an output from the position detection means 23 and the screw member 7 is driven to rotate until it is judged that the optical pickup 3 is located at the predetermined diameter position.

Next, description will be given to angular control between the optical axis 3a of the optical pickup 3 and the disk 16. The tilt detection element 17 provided on the optical pickup 3 always detects the angle between the optical axis 3a and the disk 16 in the $\theta$ direction. When this angle is deviated from a normal value, that is to say, when the angle is deviated from an angle at which the optical axis 3a is perpendicular to the disk 16, angular control is exercised.

If the disk 16 is warped in an umbrella shape or an upward convex manner, the disk 16 has an angle in a +$\theta$ direction with respect to the base 1 at the position of the optical axis 3a shown in FIG. 1(b). This angle is detected by the tilt detection element 17 and the tilt motor 21 is driven by the control means, not shown, in accordance with the output of the tilt detection element 17. Then, as the tilt motor 21 rotates, the eccentric cam 22 presses the cum follower 20c of the elevation member 20 in a $-z$ direction. Thereby, the elevation member 20 rotates in a $-\theta$ direction about the bearings 1e and 1f, the guide members 4 and 5 move in a $-z$ direction against the pressing force of the urging means 24 by the contact concave portions 20a, 20b, and in result, the guide means 4 and 5 are tilted in the +$\theta$ direction about the support portions 11 and 12, and the angle formed between the optical axis 3a of the optical pickup 3 inclined integrally with the guide members 4 and 5 and the disk 16 becomes an angle at which the optical axis 3a is perpendicular to the disk 16.

Conversely, if the disk 16 is warped in a cup shape or downward convex manner and forms an angle in the $-\theta$ direction with respect to the base 1, as the tilt motor 21 rotates, the elevation member 20 rotates in the +$\theta$ direction about the bearings 1e and 1f and the guide means 4 and 5 are moved in the +z direction under the pressing force of the urging means 23. As a result, the guide members 4 and 5 are tilted in the −θ direction about the support portions 11 and 12, and the angle formed between the optical axis 3a of the optical pickup 3 inclined integrally with the guide members 4 and 5 and the disk 16 becomes an angle at which the optical axis 3a of the optical pickup 3 is perpendicular to the disk 16.

In the foregoing operation, however, due to the inclination of the optical pickup 3 which occurs integrally with the guide members 4 and 5, an error is generated between the position of the optical axis 3a of the optical pickup 3 arranged based on the information of the position detection means 23 (which position will be referred to as the actual diameter position of the optical pickup 3) and a predetermined diameter position as in the case of the apparatus disclosed by Japanese Unexamined Patent Publication No. 10-116479 stated above.

Due to this, the pickup driving motor 6 is driven by the control means, not shown, whereby the screw member 7 is rotated, the rotational force thereof is converted into the movement force in the y direction by the inclined portion 10a engaged with the screw member 7 and the optical pickup 3 to which the engagement member 10 having the inclined portion 10a is fixed is moved in the y direction by a distance of the error stated above.

Now, the quantity of the error between the actual diameter position of the optical pickup 3 and the predetermined diameter position is defined as Δ and derived from a formula. As a comparison reference, an error between the actual diameter position of the optical pickup 3 in a driving system in which the screw member 7 is not used to drive the optical pickup 3 and a predetermined diameter position is considered. This corresponds to the driving method using driving gears as shown in Japanese Unexamined Patent Publication No. 9-198687 stated above. The error at this moment is represented by Δ' so as to differentiate from the error Δ in the above-stated apparatus.

Figure 1:
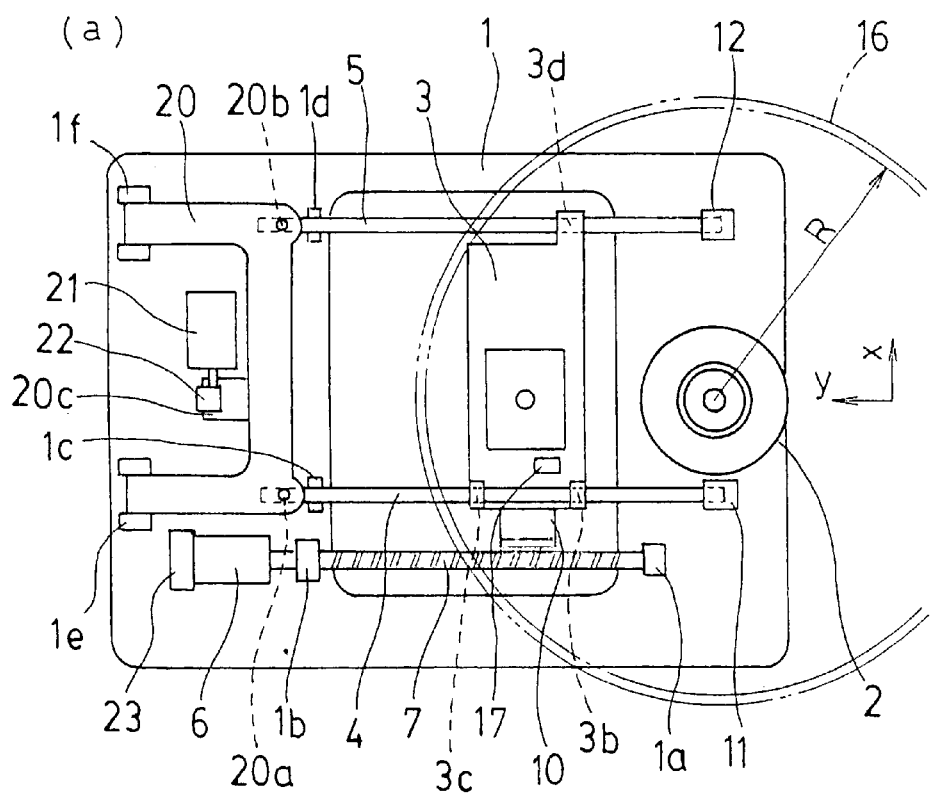
FIG. 1 is a block diagram showing essential parts of an optical pickup moving mechanism for an optical disk apparatus in a mode for carrying out the present invention.
Figure 1:
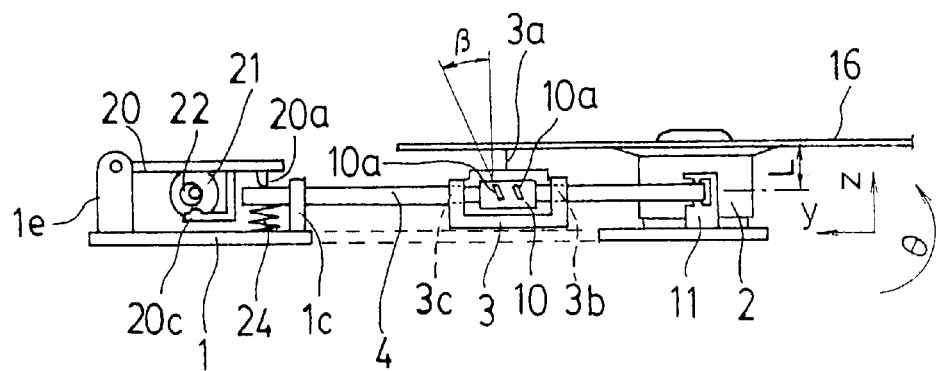
Figure 2:
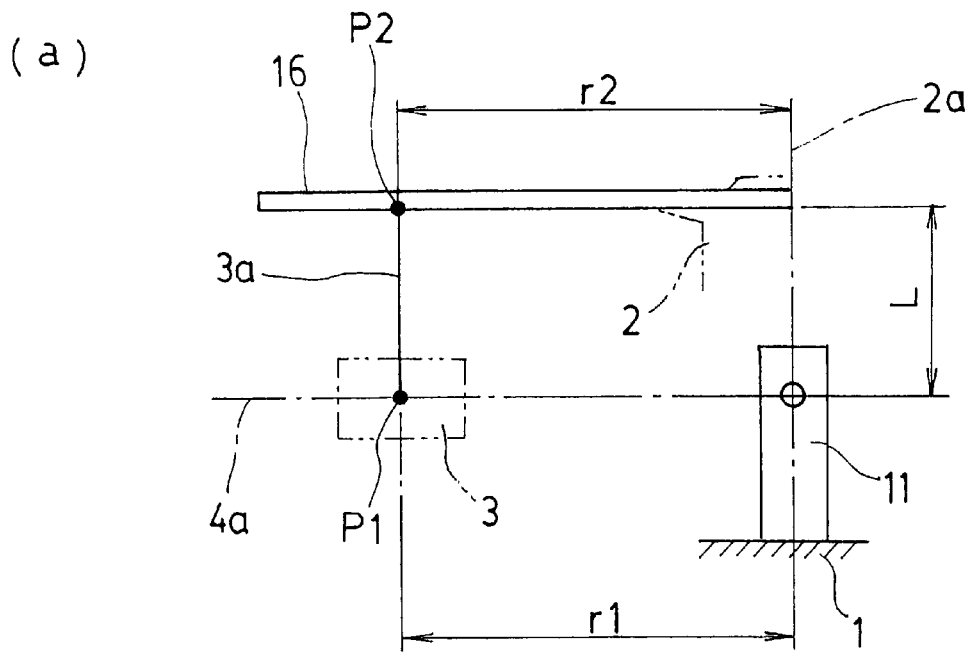
FIG. 2 is a typical view for deriving a comparison reference value Δ' of a positional error of an optical pickup.
Figure 2:
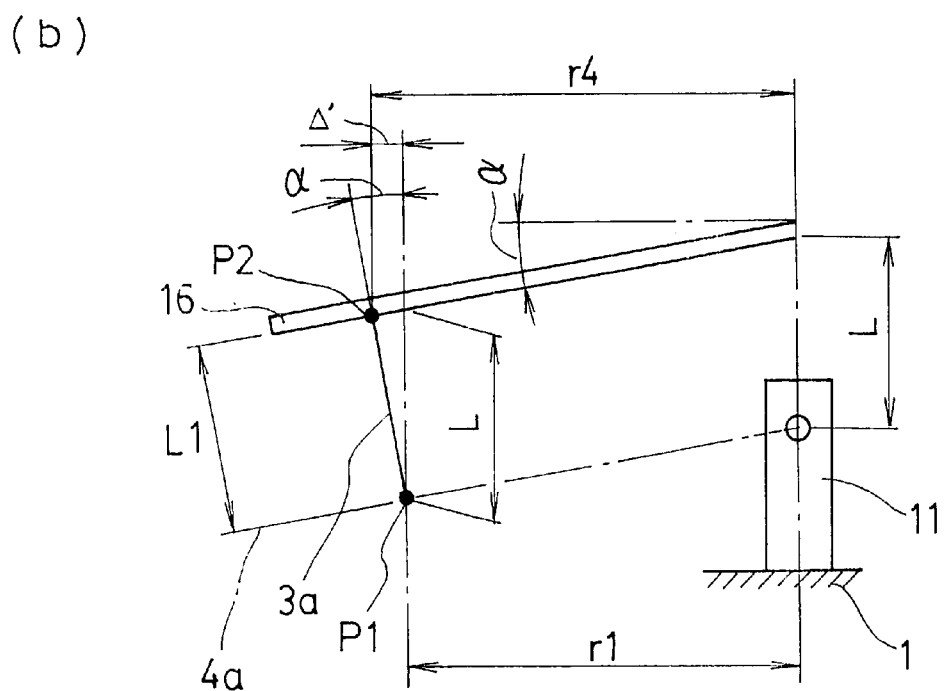

FIG. 2 is a model view for deriving the error Δ'; FIG. 2(a) shows a case where the disk 16 and the guide member 4 (and 5) are parallel to the base 1, and FIG. 2(b) shows a case where the disk 16 is inclined by an angle α in the θ direction and the guide member 4 (and 5) is also inclined by the angle α under angular control. To simplify the formula for deriving the error, the positions of the support portions 11 and 12 in the y direction are set the same as the rotationally central axis of the disk motor 2. Reference symbol 4a denotes the axial core of the guide member 4 and 2a denotes the rotationally central axis of the disk motor 2. The intersection between the axial core 4a of the guide member 4 and the optical axis 3a of the optical pickup 3 is defined as a pickup reference point P1 and the intersection between the optical axis 3a and the disk 16 is defined as a spot point P2. The distance between the disk 16 and the axial core 4a of the guide member 4 is L.

In FIG. 2(a), the pickup reference point P1 is located at the diameter position indicated by a distance r1, the optical axis 3a extends from the optical pickup 3 in parallel to the z axis and the spot point P2 is located at the diameter position indicated by a distance r2. In this case, the distances r1 and r2 are equal and no error Δ' occurs. The diameter position indicated by a distance rn will also be referred to as a diameter position rn hereinafter.

Next, the state of FIG. 2(b) in which the disk 2 is inclined by the angle α from the state of FIG. 2(a) will be considered. Since the optical pickup 3 is arranged based on information from the position detection means 23, the pickup reference point P1 is located at the diameter position indicated by the distance r1 as in the case of the state of FIG. 2(a). However, since the guide member 4 (or axial core 4a) and the optical pickup 3 supported by the guide member 4 are inclined by the angle α, the optical axis 3a is inclined by the angle α in the θ direction with respect to the z axis. As a result, the spot point P2 is located at the diameter position of the distance r4. The distance between r1 and r4 becomes the error Δ'. The distance L1 between the disk 16 and the axial core 4a of the guide member 4 is expressed by the following mathematical formula 1 and the error Δ' is expressed by the following mathematical formula 2.

$L1 = L \cdot \cos \alpha.$  Mathematical Formula 1

$\Delta' = L \cdot \cos \alpha \cdot \sin \alpha.$  Mathematical Formula 2

Here, in considering the magnitude of the inclination α of the disk 16 when the disk 16 is an ordinary 12 cm disk, it is expected that the cause of occurrence of α may be a warpage of the disc 16 alone, inclination of the disk motor 2, and inclinations due to tolerance accumulations of the parts of a mechanism. The sum can be assumed to be smaller than one degree. If α is small, the approximation of the following mathematical formula 3 is established. By assigning the mathematical formula 3 to the mathematical formula 2, therefore, the error Δ' can be expressed by a mathematical formula 4. If specific numeric values, e.g., L=10 mm and α=0.5 degree, are assigned, this error Δ' becomes 87 μm.

$\cos \alpha \approx 1, \sin \alpha \approx \alpha, \tan \alpha \approx \alpha.$  Mathematical Formula 3

$\Delta' \approx L \cdot \alpha.$  Mathematical Formula 4

Figure 3:
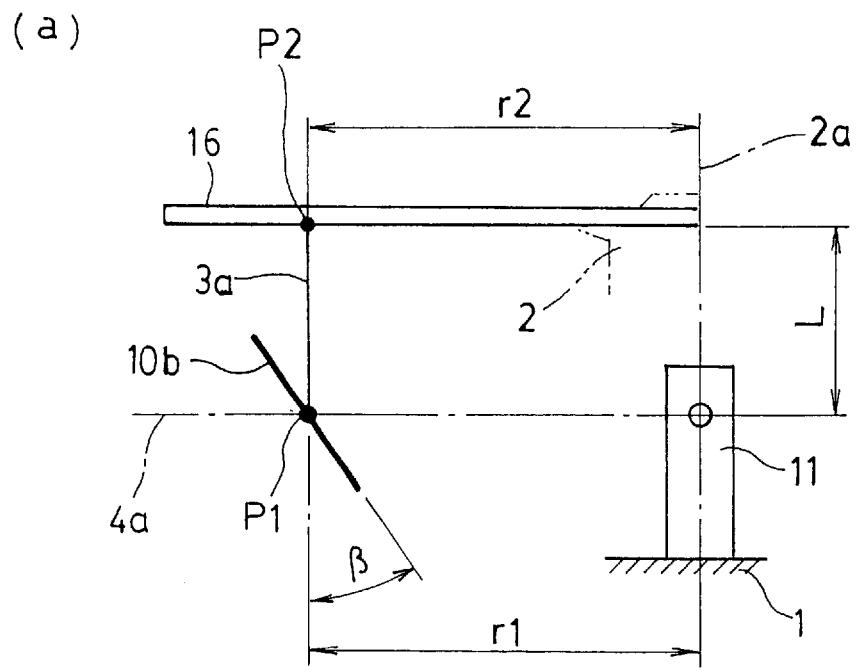
FIG. 3 is a typical view for deriving a comparison reference value Δ of a positional error of a screw driven type optical pickup.
Figure 3:
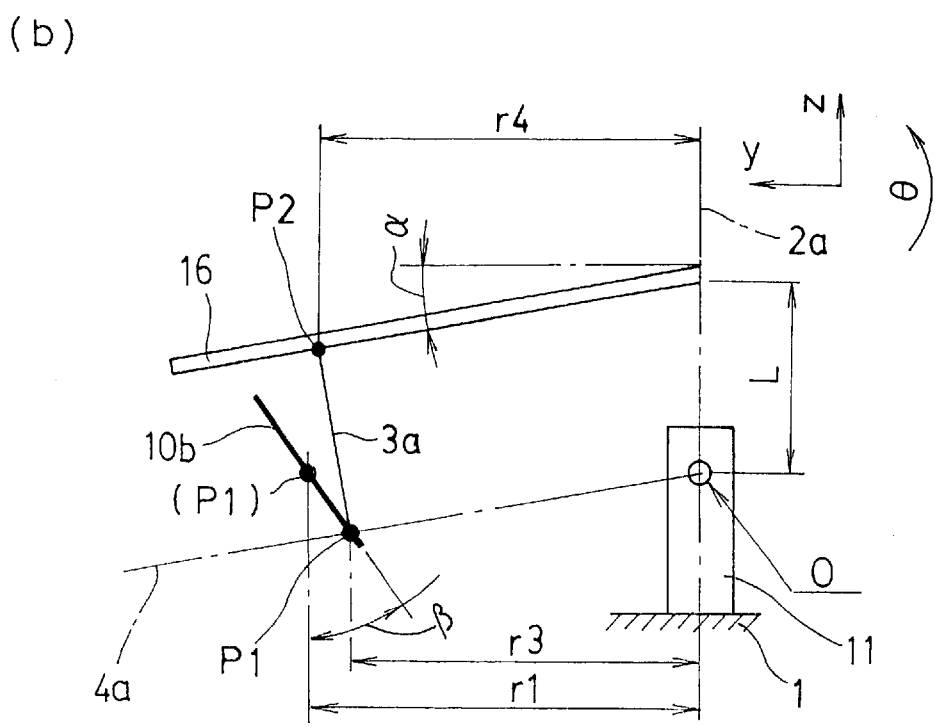

Next, description will be given to how to derive the error Δ with reference to FIG. 3. FIG. 3 is a model view for deriving the error Δ; FIG. 3(a) shows a case where the disk 16 and the guide member 4 (and 5) are not parallel to the base 4, and FIG. 3(b) shows a case where the disk 2 is inclined in the direction θ by an angle α and the guide member 4 (and 5) are inclined by the angle α due to angular control. In FIG. 3, reference symbol 10b denotes a virtual inclined portion which is parallel to the inclined portion 10a formed on the engagement member 10 and passes a pickup reference point 1e. This virtual inclined portion is inclined in the direction θ with respect to the z axis by an angle β. The movement of the optical pickup 1 to the predetermined diameter position r1 based on the information from the position detection means 9 means the rotation of the screw member 7, and is considered to be equivalent to the movement of the virtual inclined portion 10b toward a position shown in FIG. 3(a).

In the state of FIG. 3(a), as in the case of FIG. 2(a), the pickup reference point P1 is located at the diameter position indicated by the distance r1, the optical axis 3a extends parallel to the z axis from the optical pickup 3 and a spot P2 is located at the diameter position indicated by the distance r2. That is, the diameter position r1 is equal to the diameter position r2 at which the spot point 2a is located and the error Δ does not occur.

The state of FIG. 3(b) showing that the disk 16 is inclined by the angle α from the state of FIG. 3(a) will be considered. Since the optical pickup 3 is arranged based on the information from the position detection means 23, the virtual inclined portion 10b is located at a position indicated by the distance r1 as in the case of FIG. 3(a). However, the pickup reference point is shifted from the position of (P1) in FIG.

3(a) to a position shown in FIG. 3(b). This implies, judging from the actual apparatus, that even if the optical pickup 3 is located at the diameter position r1, the optical pickup 3 moves in the y direction along the threaded groove of the screw member 7 in accordance with the tilting of the guide member 4.

The diameter position r3 of the pickup reference point P1 in FIG. 3(b) will be obtained. The pickup reference point P1 is expressed by the intersection between the axial core 4a of the guide member 4 and the virtual inclined portion 10b. If the support portion 11 is assumed as an origin O, the axial core 4a of the guide member 4 can be expressed by the following mathematical formula 5 by approximating the mathematical formula 3, and the virtual inclined portion 10b can be expressed by a mathematical formula 6. If z is set equal between the two formulas, y and z to be obtained indicate the coordinates of the pickup reference point P1, and y at this moment becomes a diameter position r3. Accordingly, a mathematical formula 7 is obtained from the mathematical formulas 5 and 6.

$$z = (-\tan \alpha) \cdot y \approx -\alpha \cdot y. \qquad \text{Mathematical Formula 5}$$

$$Y = r1 + \tan \beta \cdot z. \qquad \text{Mathematical Formula 6}$$

$$r3 = r1/(1 + \alpha \cdot \tan \beta). \qquad \text{Mathematical Formula 7}$$

Furthermore, the positional relationship between the pickup reference point P1 and the spot point P2 in FIG. 3(b) is equal to the positional relationship in FIG. 2(b). Accordingly, the difference between the radial positions r4 and r3 at the spot position P2 is equal to the error Δ' obtained while referring to FIG. 2(b) and (r4−r3) is obtained as the following mathematical expression 8 using the mathematical expression 4. Further, the error Δ is defined by (r4−r1). Due to this, if the mathematical formulas 7 and 8 are assigned to the definition formula of the error Δ and arranged in order, then the error Δ is expressed by a mathematical formula 9. Besides, if the inclination α of the disk is small and the angle β of the inclined portion 10a of the engagement member 10 is not so extremely large, e.g., α<one degree and β<45 degrees, then a mathematical formula 10 is established. The mathematical formula 9 can be approximated to a mathematical formula 11.

$$r4 - r3 = \Delta' \approx L \cdot \alpha. \qquad \text{Mathematical Formula 8}$$

$$\Delta = L \cdot \alpha - (\alpha \cdot \tan \beta \cdot r1)/(1 + \alpha \cdot \tan \beta). \qquad \text{Mathematical Formula 9}$$

$$\alpha \cdot \tan \beta \ll 1. \qquad \text{Mathematical Formula 10}$$

$$\Delta = L \cdot \alpha - \alpha \cdot \tan \beta \cdot r1 = \Delta' - \alpha \cdot \tan \beta \cdot r1. \qquad \text{Mathematical Formula 11}$$

Figure 4:
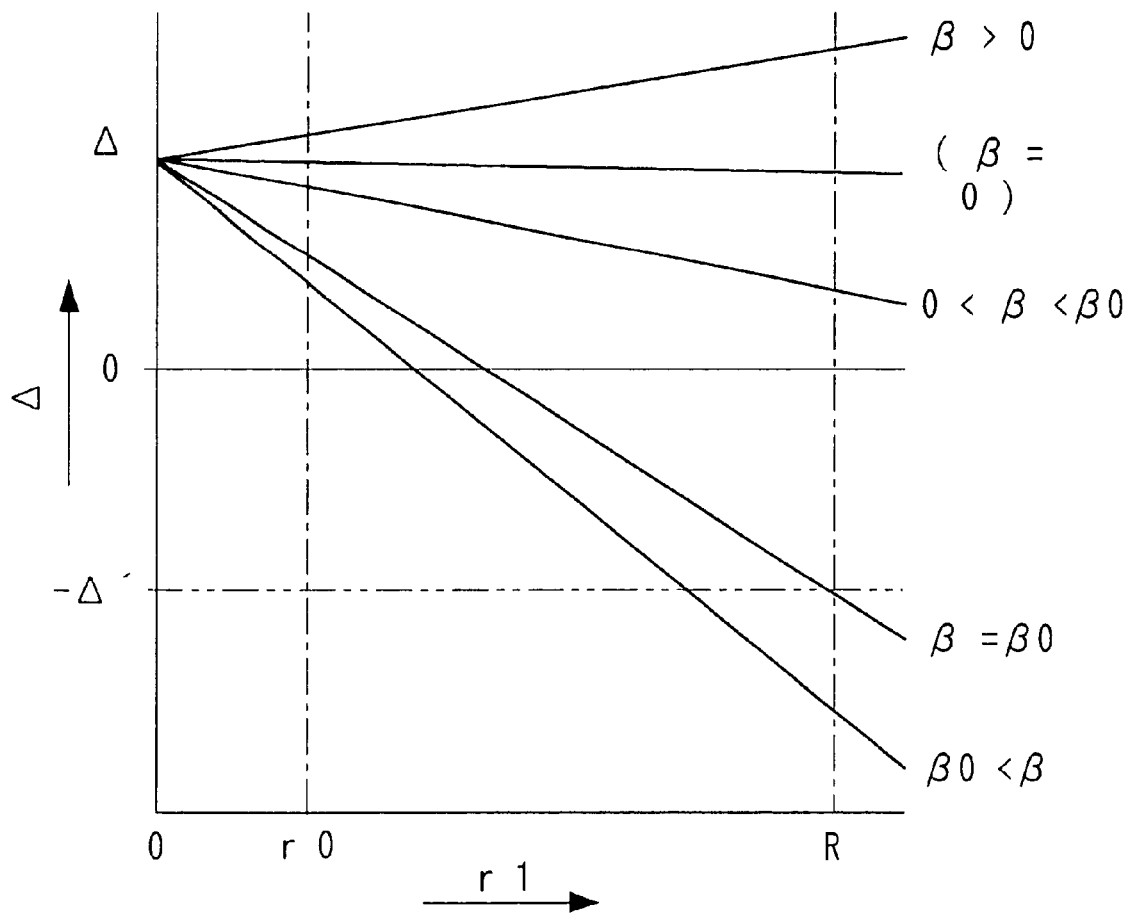
FIG. 4 is a correlation view showing inclinations of the positional error Δ.

This mathematical formula 11 will be described with reference to FIG. 4. FIG. 4 is a chart showing the correlation between the predetermined diameter position r1 and the error Δ when the inclination α of the disk 16 is a certain value (>0) A possible range of the diameter position r1 is a range of the disk 16 in which information is recorded, or a recordable range, that is between r0 (minimum diameter) and R (maximum diameter). Further, a line indicated by (β=0) is an error Δ derived if the screw member is not employed, which is a constant value Δ' without depending on r1.

If the angle β of the inclined portion 10a falls within a certain range as shown in FIG. 4, the absolute value of the error Δ is always lower than the absolute value of the error Δ' for a case where the screw member 7 is not used. To be specific, β is in a range higher than 0 and lower than β0. β0 is defined as β if the error Δ is equal to −Δ' when the diameter position r1 is the maximum diameter R and derived as a value expressed by the following mathematical formula 12 based on the mathematical formula 11.

$$\tan \beta 0 = 2 \cdot 19 \, L/R. \qquad \text{Mathematical Formula 12}$$

Accordingly, by selecting the inclination β of the inclined portion 10a engaged with the screw member 7 to fall within an appropriate range or, to be specific, selecting the inclination β to fall within a range higher than 0 and lower than β0 shown in the mathematical formula 12 in the +θ direction shown in FIG. 1(b), it is possible to make the error Δ smaller than the error caused to occur by the driving method using no screw members 7.

What is claimed is:

1. A pickup moving mechanism for an optical disk apparatus, comprising:

a guide member supporting an optical pickup for directing a laser beam at an optical disk to record or reproduce information, and moving the optical pickup in a disk diameter direction;

pickup driving means for moving said optical pickup;

position detecting means for detecting a position of said optical pickup in a disk diameter direction;

tilt detection means for detecting an angle deviation between an ideal intersection point of an optical axis of with an optical disk with no inclination of said optical pickup relative to the disk, and an actual intersection point of said optical axis for the optical pickup moved by a preset distance with respect to a recording or reproducing target position on said optical disk in the disk diameter direction; and tilt driving means for tilting the guide member in accordance with an output of said tilt detection means, and for inclining the optical pickup supported by the guide member in a direction in which the angle deviation of said optical axis decreases, wherein said pickup moving mechanism further comprises control means for controlling said pickup driving means to move the optical pickup in a direction that causes a decreasing deviation between an ideal intersection point of the optical axis with an optical disk with no inclination of said optical pickup relative to the disk, and an actual intersection point of said optical axis with the disk in the disk diameter direction, wherein said deviation is generated by inclination of said optical pickup and decreases so that the deviation due to the inclination is canceled after the movement.

2. The pickup moving mechanism for an optical disk apparatus according to claim 1, wherein the pickup driving means comprises:

a screw member having a lengthwise axis and located adjacent the guide member for rotating about the lengthwise axis;

an engagement member located at the optical pickup and engaging said screw member to convert rotation of the screw member into linear movement of the optical pickup in the disk diameter direction; and a rotation driving portion for driving said screw member.

3. The pickup moving mechanism for an optical disk apparatus according to claim 1, further comprising a base, wherein the tilt driving means comprises:

a support portion tiltably supporting the guide member in a direction in which the guide member approaches and separates from the base;

urging means located between one end portion of the tiltable guide member and the base, and for urging the one end portion of the guide member in a direction separating the one end portion from the base;

pressing means located for freely elevatable movement while facing the one end portion of said guide member, and adapted to press the one end portion of the guide member against an urging force of said urging means; and elevation driving means for driving the pressing means to elevate in accordance with an output of the tilt detection means.

4. The pickup moving mechanism for an optical disk apparatus according to claim 2, wherein an inclined portion of the engagement member engaging threaded groove of the screw member is located so that an angle of the inclined portion with the optical axis of the optical pickup is greater than zero and a tangent thereof is smaller than 2L/R when information is recordable or reproducible up to a position of a diameter R on the optical disk and L is a distance between a support portion supporting another end portion of the guide member and the optical disk.

5. A pickup moving method for an optical disk apparatus, comprising:

directing a laser beam with an optical pickup at an optical disk to record or reproduce information, wherein the optical pickup is supported by a guide member and moved in an optical disk diameter direction;

moving the optical pickup along the guide member for a preset distance with respect to a recording or reproducing target position on an optical disk while detecting a position of said optical pickup in the disk diameter direction;

detecting an angle deviation of the moved optical pickup from an optical axis in the disk diameter direction;

tilting said guide member based on a detection result, and inclining the optical pickup supported by the guide member in a direction in which the angle deviation of said optical axis decreases; and moving the optical pickup in a direction that causes a decreasing deviation between an ideal intersection point of the optical axis with an optical disk with no inclination of said optical pickup relative to the disk, and an actual intersection point with the disk in the disk diameter direction, wherein said deviation is generated by inclination of the optical pickup and decreases so that the deviation due to the inclination is canceled after the increment.

6. The pickup moving method for an optical disk apparatus according to claim 5, further comprising, when the optical pickup is inclined in a direction in which the optical pickup approaches location of an optical disk, moving the optical pickup toward a location of an outer peripheral edge of an optical disk in the disk diameter direction.

* * * * *